(12) United States Patent
Marupaduga et al.

(10) Patent No.: US 9,723,535 B1
(45) Date of Patent: Aug. 1, 2017

(54) WIRELESS NETWORK NEIGHBOR LIST OPTIMIZATION BASED ON GROUP DELAY METRICS

(71) Applicant: Sprint Spectrum L.P., Overland Park, KS (US)

(72) Inventors: Sreekar Marupaduga, Overland Park, KS (US); Gauravpuri Goswami, Overland Park, KS (US); Andrew M. Wurtenberger, Olathe, KS (US); Patrick J. Schmidt, Bonner Springs, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/536,908

(22) Filed: Nov. 10, 2014

(51) Int. Cl.
| | | |
|---|---|---|
| *H04W 36/00* | (2009.01) | |
| *H04W 36/32* | (2009.01) | |
| *H04W 36/08* | (2009.01) | |
| *H04W 36/38* | (2009.01) | |
| *H04W 36/14* | (2009.01) | |
| *H04W 36/22* | (2009.01) | |

(52) U.S. Cl.
CPC .......... *H04W 36/32* (2013.01); *H04W 36/08* (2013.01); *H04W 36/14* (2013.01); *H04W 36/22* (2013.01); *H04W 36/38* (2013.01)

(58) Field of Classification Search
CPC . H04W 24/10; H04W 24/08; H04W 36/0061; H04W 72/0406; H04W 72/085
See application file for complete search history.

(56) References Cited

U.S. PATENT DOCUMENTS

| | | | | |
|---|---|---|---|---|
| 6,119,005 A | * | 9/2000 | Smolik | H04B 7/2628 370/320 |
| 6,175,587 B1 | * | 1/2001 | Madhow et al. | 375/148 |
| 8,391,870 B1 | * | 3/2013 | Singh | H04W 36/0083 370/332 |
| 9,002,359 B1 | * | 4/2015 | Vargantwar | H04W 36/0044 370/320 |
| 2009/0073031 A1 | * | 3/2009 | Kim | G01S 5/0205 342/357.43 |
| 2009/0125220 A1 | * | 5/2009 | Kim | H04W 64/006 701/119 |
| 2013/0143577 A1 | * | 6/2013 | Chiu et al. | 455/442 |

* cited by examiner

*Primary Examiner* — Khalid Shaheed
*Assistant Examiner* — K Wilford

(57) ABSTRACT

Systems and methods for performing UE handover based on group delay variation include a base station (i) selecting a target neighbor sector from a plurality of neighbor sectors for the handover, where each neighbor sector has a group delay metric, and where the target neighbor sector is selected from the neighbor sectors based at least in part on each neighbor sector's group delay variation and (ii) initiating handover of the UE to the target neighbor sector. Some embodiments include creating a neighbor relations table (NRT) comprising at least some of the neighbor sectors, and prioritizing the NRT based on group delay and/or group delay variation. In some embodiments, selection of the target neighbor sector for the handover is additionally based on neighbor sector handover success rates and Reference Signal Receive Power (RSRP) values for neighbor sectors reported by the UE for which the handover is to be performed.

20 Claims, 4 Drawing Sheets ns section is not prior art itself to the claims and is not admitted to be prior art by inclusion in this section.

WIRELESS NETWORK NEIGHBOR LIST OPTIMIZATION BASED ON GROUP DELAY METRICS

BACKGROUND

Unless otherwise indicated herein, the description in this section is not prior art itself to the claims and is not admitted to be prior art by inclusion in this section.

Cellular wireless networks typically include a number of base stations that radiate to define wireless coverage areas, such as cells and/or cell sectors, in which user equipment devices (UEs) (also known as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol defines its own procedures for registration of UEs, initiation of communications, allocation of bandwidth for UE communications, as well as handoff/handover of UEs between coverage areas, cells, and/or sectors.

OVERVIEW

Wireless network base stations typically operate within a configured frequency range. In operation, some base stations may have band-pass filters to pass the configured frequency range (i.e., the pass band of the filter), and band-stop filters to block frequencies outside of the configured frequency range. For example, in some LTE deployments, some base stations may be configured with filters that pass an entire LTE band (e.g., LTE Band 41) and block frequencies outside of the band. In other LTE deployments, some base stations may be configured with filters that pass a portion of an LTE band (e.g., a 50 MHz range of frequencies within LTE Band 41 and block frequencies outside of the desired portion the LTE band (e.g., outside of the desired 50 MHz frequency range).

Signals that traverse filters on a base station will experience various signal impairments, including group delay, which is a measure of the time delay of the amplitude envelopes of the various sinusoidal components (e.g., subcarriers in multi-carrier transmission systems) of the signal as the signal propagates through a filter. Group delay is inversely proportional to filter bandwidth and nearly proportional to the order of the filter. Because group delay is a function of the filter configuration, the group delay is a static value that can be measured and quantified. Base stations that provide service on multiple sectors typically have a set of one or more filters for each sector. For such deployments, the group delay for each sector of the base station can be measured and quantified.

In LTE networks, group delay variation tends to be more problematic than the delay of any individual subcarrier in part because of the way subcarriers are managed and allocated for data transmissions between base stations and UEs. In particular, in LTE networks, an LTE band is divided into many small resource blocks, where each resource block includes twelve 15 kHz subcarriers. In the downlink direction (from the base station to the UE), LTE uses Orthogonal Frequency Division Multiple Access (OFDMA) to allocate resource blocks to data transmissions, where the subcarriers of an active resource block are modulated using, for example, QPSK (Quadrature Phase-Shift Keying), 16-QAM (Quadrature Amplitude Modulation), 64-QAM, or perhaps other digital modulation schemes. In the uplink direction (from the UE to the base station), LTE uses a pre-coded version of OFDM known as Single Carrier Frequency Division Multiple Access (SC-FDMA), where data is spread across the subcarriers of one or more resource blocks, which are modulated using, for example, QPSK, 16-QAM, 64-QAM, or perhaps other digital modulation schemes. Differences in the group delay between the subcarriers of a resource block, as well as differences in the group delay between subcarriers of different resource blocks, can cause signal distortions that reduce signal quality. Group delay variation based distortion may render some subcarriers unable support higher order modulation schemes (e.g., 16-QAM and 64-QAM). As a result, in some instances, the affected subcarriers may only be able to support lower order modulation schemes (e.g., QPSK), thereby reducing the effective throughput that can be achieved with the affected subcarriers.

One way to reduce the adverse effects of group delay and the resulting group delay variation in a wireless network is to steer UEs to base stations or particular sectors served by a base station that have lower group delay variation. A typical LTE base station (i.e., LTE eNodeB) executes an Automatic Neighbor Relation (ANR) process that builds a Neighbor Relation Table (NRT) for each sector served by the base station. A particular sector's NRT includes a list of that particular sector's neighbor sectors. After determining that a particular UE should be handed over from its current sector to another sector, a base station refers to the current sector's NRT to select a target sector to which the base station will handover the UE.

Disclosed herein are systems and methods for creating and prioritizing a sector's NRT based on group delay variation metrics and for handing over UEs between sectors based at least in part on group delay variation considerations.

In some embodiments of the disclosed systems and methods, a base station may add neighbor sectors to and/or remove neighbor sectors from a particular sector's NRT based on a group delay metric for each of the neighbor sectors, such as each neighbor sector's group delay or group delay variation. For example, in some embodiments, a base station may only add neighbor sectors to a particular sector's NRT that have a group delay variation that is less than a threshold group delay variation. Similarly, in some embodiments, a base station may remove neighbor sectors from a particular sector's NRT that have a group delay variation that exceeds the threshold group delay variation.

Also, in some embodiments, a base station may additionally or alternatively, prioritize the neighbor sectors in a particular sector's NRT based at least in part on each neighbor sector's group delay or group delay variation. For example, a base station may rank the neighbor sectors in a particular sector's NRT according to each neighbor sector's group delay variation alone. Then once the base station determines that a particular UE should be handed over to another sector, the base station may use the prioritized NRT to select a neighbor sector to which the base station will handover the particular UE.

Some embodiments also include a base station making a handover determination for a UE (i.e., deciding that a particular UE should be handed over to another sector), and in response to making the handover determination, selecting one neighbor sector from a plurality of neighbor sectors (e.g., from the NRT comprising the plurality of neighbor sectors) based at least in part on each neighbor sector's group delay metric (e.g., group delay or group delay variation). After selecting the one neighbor sector as the target neighbor sector for the handover, the base station then initiates handover of the UE to the selected neighbor sector by, for example, sending a handover request for the UE to the base station providing service on the selected neighbor sector.

In some embodiments, the step of selecting the one neighbor sector may include choosing a set of candidate neighbor sectors for the handover from the plurality of neighbor sectors and selecting the one neighbor sector as the target sector from the set of candidate neighbor sectors, where the selected neighbor sector (i.e. the target sector) has the lowest group delay metric of the chosen set of candidate neighbor sectors. In some embodiments, the base station chooses the set of candidate neighbor sectors based on one or both of (i) handover success rates and/or (ii) Reference Signal Receive Power (RSRP) values reported by the UE for which the base station has made the handover determination.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
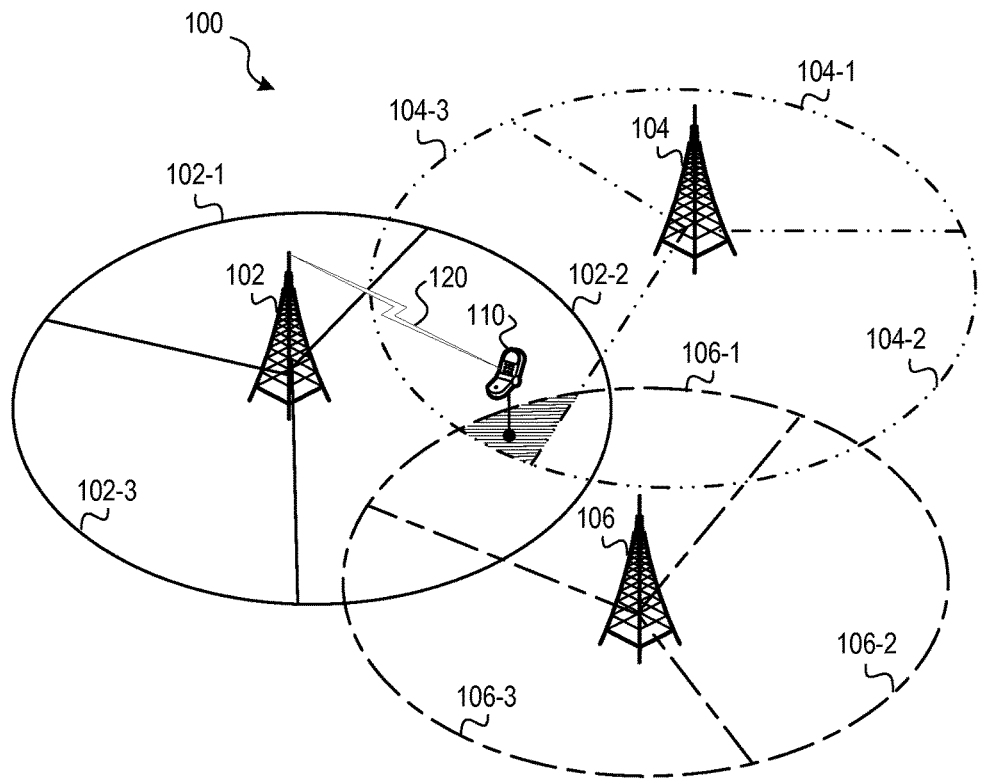
FIG. 1 is a simplified network diagram of an example wireless communications network according to some embodiments of the disclosed systems and methods.

FIG. 1 is a simplified network diagram of a wireless network 100 configured for wireless network neighbor list optimization and/or handover based on group delay metrics according to embodiments of the systems and methods described herein.

Wireless network 100 includes a plurality of base stations 102-106. Each base station 102-106 may include one or more base transceiver stations (BTSs), access nodes, node-Bs, eNodeBs (eNBs), and/or other supporting network infrastructure for providing wireless service in one or more sectors. In the example shown in FIG. 1, the wireless network is an LTE network and each base station 102-106 includes one or more LTE eNodeBs. However, in other embodiments, the wireless network 100 may operate according to other wireless protocols, including but not limited to any of the wireless protocols disclosed herein.

Each base station in network 100 is configured to provide wireless service in a plurality of sectors. In the example embodiment shown in FIG. 1, each base station provides wireless service in three sectors. In particular, base station 102 provides wireless service in sectors 102-1, 102-2, and 102-3; base station 104 provides wireless service in sectors 104-1, 104-2, and 104-3; and base station 106 provides wireless service in sectors 106-1, 106-2, and 106-3. For example, base station 102 is providing wireless service in sector 102-2 to UE 110 via wireless link 120. In other embodiments, individual base stations may provide service on more or fewer than three sectors. For example, in some embodiments, element 102 may represent a single tower with three separate base stations, where each base station provides wireless service on a single sector, i.e., a first base station providing wireless service in sector 102-1, a second base station providing wireless service in sector 102-2, and a third base station providing wireless service in sector 102-3.

In operation, each base station 102-106 maintains an NRT for each sector for which the base station provides wireless service. For example, base station 102 maintains an NRT for sector 102-1, an NRT for sector 102-2, and an NRT for sector 102-3; base station 104 maintains an NRT for sector 104-1, an NRT for sector 104-2, and an NRT for sector 104-3; and base station 106 maintains an NRT for sector 106-1, an NRT for sector 106-2, and an NRT for sector 106-3.

Each sector's NRT includes a listing of that sector's neighbor sectors. A particular sector's neighbor sectors include sectors that are adjacent to and/or at least partially overlap with that particular sector. Sectors that are adjacent to and/or overlap with a particular sector can be determined in a number of ways. In some embodiments, a network operator may manually provision a particular sector's NRT with neighbor sectors based on the network operator's knowledge of the wireless network implementation. In other embodiments, a base station may execute an ANR function that determines the neighbor sectors for a particular sector via any number of different methods, such as, for example:

(i) inter base station signaling, (ii) intra base station signaling for base stations that support multiple sectors, (iii) collecting data from UEs served by a particular sector about all of the other sectors that the UEs detect; and/or (iv) any combination of the above-described manual and/or automated methods.

As noted above, a particular sector's neighbor sectors include sectors that are adjacent to and/or at least partially overlap with that particular sector. Table 130 shows an example NRT for sector 102-2, which includes: (i) adjacent sectors 102-1 and 102-3; and (ii) overlapping sectors 104-2, 104-3, 106-1, and 106-3. Although sectors 102-1 and 102-3 are shown as adjacent to each other in FIG. 1, in operation, sector 102-2 will overlap at least somewhat with adjacent sectors 102-1 and 102-3, although perhaps not necessarily to the same extent that sector 102-2 overlaps with sectors 104-2, 104-3, 106-1, and 106-3. In some embodiments, a particular sector's neighbor sectors may additionally include sectors that are adjacent to that particular sector's overlapping sectors. For example, in such embodiments, the NRT for sector 102-2 might additionally include sectors 104-1 and 106-2.

The NRT for a particular sector may include a variety of information about each neighbor sector. In some embodiments, the NRT for a particular sector may comprise, for each neighbor sector in the NRT, (i) an identification of the neighbor sector, such as the neighbor sector's cell identifier, sector identifier, or similar identification, (ii) a handover success rate for that neighbor sector, and (iii) a group delay metric for the neighbor sector, such as a measure of the group delay or group delay variation for the sector. A sector's cell identifier is a value typically set by the network operator when the sector is implemented in the network. A sector's handover success rate may be determined or calculated by the base station by dividing the number of successful handovers to that sector by the total number of handover attempts to that sector. Finally, the group delay variation for a sector is a fixed value that may be determined from the particular filters in use for that sector.

More particularly, with regard to the group delay metric for each neighbor sector, each sector in the wireless network 100 provides service within a range of frequencies determined by the network operator. A base station that provides service in a sector is typically equipped with one or more band pass filters that are designed to pass the range of frequencies for the sector and/or one or more band stop filters that are designed to block frequencies outside of the range of frequencies for the sector. These band pass and/or band stop filters introduce group delay and cause corresponding group delay variation between the frequencies within the frequency range of the sector. Most of the group delay variation is experienced by frequencies near the upper and lower limits of the frequency range. The extent of the group delay and resulting group delay variation is based on the particular filter configuration, where group delay is inversely proportional to filter bandwidth and nearly proportional to the order of the filter. Because group delay is based on the filter configuration, the group delay for a particular sector equipped with filters is a value that is known in advance by the network operator and would likely not change over time unless the filter configuration is later changed.

The example NRT shown in table 130 of FIG. 1 includes a listing of each neighbor sector for sector 102-2. For each neighbor sector of sector 102-2, the NRT includes that neighbor sector's (i) handover success rate as a percentage of successful handovers and (ii) group delay variation in nanoseconds. In some embodiments, base station 102 may prioritize the NRT for sector 102-2 based on group delay variation. Table 132 in FIG. 1 shows the NRT for sector 102-2 after base station 102 has prioritized the NRT according to each neighbor sector's group delay variation. As shown in table 132, the prioritized NRT has neighbor sectors with lower group delay variation positioned higher in the list than neighbor sectors with higher group delay variation. In some embodiments, base station 102 may additionally execute an ANR function to add neighbor sectors to or remove neighbor sectors from the NRT based on each neighbor sector's group delay variation. In such embodiments, the base station may (i) include neighbor sectors in the NRT based on their having a group delay variation metric that is less than a predetermined group delay variation threshold, and/or (ii) remove neighbor sectors from the NRT based on their having a group delay variation that exceeds the predetermined group delay variation threshold. For example, in such embodiments (not shown), the prioritized NRT may not include sectors 102-3 or 104-3 if the predetermined group delay variation threshold is set to 150 nanoseconds.

In operation, when base station 102 determines that UE 110 should be handed over to another sector, base station 102 may refer to the prioritized NRT shown in table 132 to select a neighbor sector as the target sector for the handover of UE 110. To select a particular neighbor sector for the handover of UE 110, base station 102 may further limit the set of neighbor sectors in the prioritized NRT to a set of candidate neighbor sectors for UE 110. In operation, UE 110 may report a list of candidate sectors to base station 102, and base station 102 may in turn select one of the candidate sectors from the prioritized list of neighbor sectors in the prioritized NRT 132 as the target sector for the handover of UE 110. In other embodiments, the base station 102 may determine a set of candidate sectors from RSRP metrics for the neighbor sectors reported to the base station 102 by the UE 110 and/or handover success ratios of the neighbor sectors in the NRT. In some embodiments, the selected neighbor sector is a candidate sector from the set of candidate sectors in the NRT 130 (or prioritized NRT 132) having the lowest group delay variation.

Table 134 shows the candidate neighbor sectors from which base station 102 may select the target sector for the handover of UE 110. In the example shown in FIG. 1, and as indicated by bolded text in table 134, base station 102 selects neighbor sector 106-1 as the target sector for the handover of UE 110 because, as between neighbor sectors 106-1 and 104-3 (the two candidate sectors for the handover chosen from the NRT for sector 102-2), sector 106-1 has the lower group delay variation. In this example, base station 102 selects neighbor sector 106-1 for the handover over neighbor sector 104-3 even though neighbor sector 104-3 has a higher handover success rate (94.6% for 104-3 as compared to 91.2% for 106-1). After selecting neighbor sector 106-3 as the target sector for the handover, base station 102 may then initiate the handover of UE 110 from sector 102-2 to sector 106-3 served by base station 106 by, for example, sending a handover request message to base station 106.

In some embodiments, base station 102 may use group delay variation in combination with one or more other metrics for selecting the target sector for a handover. For example, in some embodiments, base station 102 may consider both the group delay variation and the handover success rate of each neighbor sector when selecting a target sector for handover. In some embodiments, for the target sector, the base station 102 may select the neighbor sector having the lowest group delay variation that also has a handover success rate that is greater than a particular handover success rate threshold. In such embodiments, the base station may select as the target sector for a handover, a particular neighbor sector that may not have the lowest group delay variation of all of the neighbor sectors.

For example, if a first neighbor sector has a handover success rate of 80% and a group delay variation of 30 nanoseconds, a second neighbor sector has a handover success rate of 87% and a group delay variation of 100 nanoseconds, and a third neighbor sector has a handover success rate of 95% and a group delay variation of 110 nanoseconds, the base station may select the second neighbor sector over the first and third neighbor sectors for handover because the second neighbor sector has the lowest group delay variation among the neighbor sectors with a handover success rate over a preconfigured handover success rate threshold of 85%. Handover success rate thresholds other than 85% could be used as well. In this manner, the base station is selecting a particular neighbor sector as the target sector for handover based at least in part on each neighbor sector's group delay variation metric. After selecting the target sector for the handover, the base station may then initiate the handover of the UE to the target sector by, for example, sending a handover request to the base station that is providing service on the selected target sector.

In still further embodiments, a base station may use group delay variation in combination with RSRP for selecting a target sector for handover of a UE. In particular, for the target sector, the base station may select the neighbor sector having the lowest group delay variation that also has a reported RSRP for the UE that is greater than a particular RSRP threshold. In these embodiments, the base station may select as the target sector for a handover, a particular neighbor sector that may not have the lowest group delay variation of all of the neighbor sectors.

For example, if a first neighbor sector has a group delay variation of 30 nanoseconds and a reported RSRP of −110 dBm by the UE, a second neighbor sector has a group delay variation of 60 nanoseconds and a reported RSRP of −40 dBm, and a third neighbor sector has a group delay variation of 50 nanoseconds and a reported RSRP of −80 dBm, the base station may select the third neighbor sector over the first and second neighbor sectors for handover of the UE because the third neighbor sector has the lowest group delay variation among the neighbor sectors with a reported RSRP by UE over a preconfigured RSRP threshold of −100 dBm. RSRP thresholds other than 100 dBm could be used as well. In this manner, the base station is selecting a particular neighbor sector as the target sector for handover based at least in part on each neighbor sector's group delay variation metric. After selecting the target sector for the handover, the base station may then initiate the handover of the UE to the target sector by, for example, sending a handover request to the base station that is providing service on the selected target sector.

In still further embodiments, a base station may use group delay variation in combination with both handover success rate and RSRP for selecting a target sector for handover of a UE. In particular, for the target sector, the base station may select the neighbor sector having the lowest group delay variation that also has both (i) a reported RSRP for the UE that is greater than a particular RSRP threshold and (ii) a handover success rate that is greater than a particular handover success rate threshold. In other embodiments, a base station may use group delay variation in combination with one or more other factors for selecting a target sector for handover of a UE.

Figure 2:
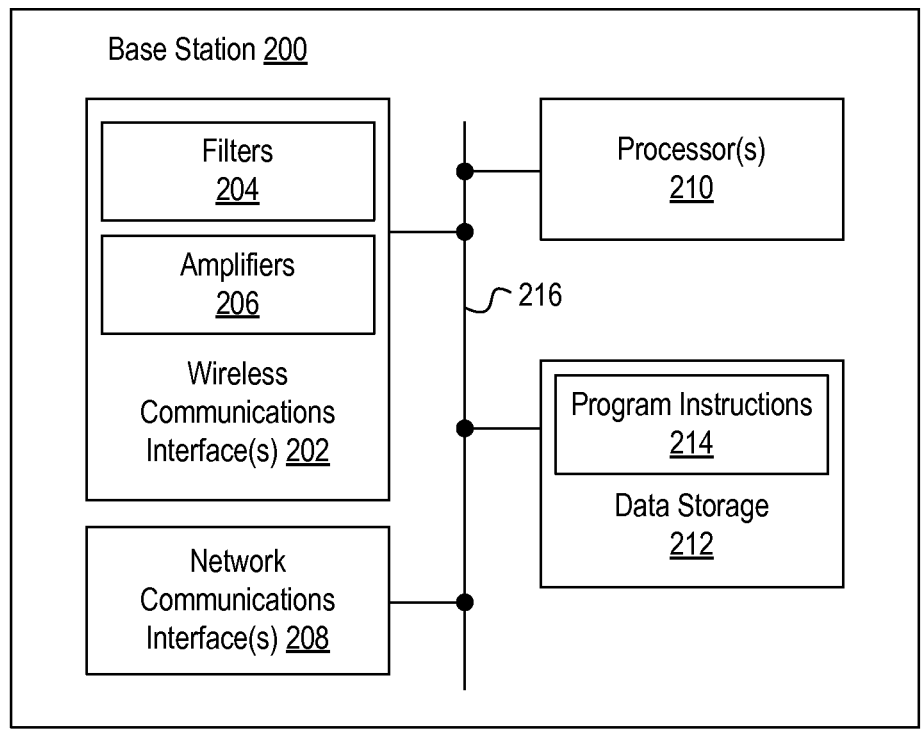
FIG. 2 is a simplified block diagram of an example base station according to some embodiments of the disclosed systems and methods.

FIG. 2 is a simplified block diagram of an example base station 200 according to some embodiments of the disclosed systems and methods, including, for example, base stations 102-106 of FIG. 1. It will be appreciated that there can be numerous specific implementations of a base station, such as base station 200, in which the disclosed methods for wireless network neighbor list optimization and/or handover based on group delay metrics could be implemented. As such, base station 200 is representative of a means for carrying out wireless network neighbor list optimization and/or handover determination based on group delay metrics, in accordance with the methods and steps described herein by way of example.

The example base station 200 includes one or more wireless communications interfaces 202, one or more network communications interfaces 208, one or more processors 210, and data storage 212, all of which may be coupled together by a system bus 216 or similar mechanism. In addition, the base station 200 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols noted herein, in addition to other protocols now known or later developed. In particular, the components of the example base station 200 are configured to support wireless network neighbor list optimization and/or handover determination based on group delay metrics in accordance with the example embodiments described herein.

The one or more wireless communications interfaces 202 may include one or more transceivers, amplifiers 206, filters 204, antennas, and other associated components that enable the base station 200 to engage in air interface communication with one or more wireless communications devices, such as UE 110 shown in FIG. 1, according to any of the air interface protocols described herein (e.g., CDMA, GSM, LTE, etc.). The one or more amplifiers 206 and filters 204 are configured to support transmissions within a configured frequency range on (1) the downlink (or forward link) from the base station 200 to a wireless communications device and (2) the uplink (or reverse link) from the wireless communications device to the base station 200. Some embodiments may use different frequency ranges for the uplink and downlink. Additionally, in some embodiments, the one or more wireless communications interfaces 202 are configured to support transmissions to and from one or more wireless communications interfaces of one or more relays associated with the base station 200.

The one or more network interfaces 208 include physical network interfaces (e.g., optical, electrical) that enable the base station 200 to send and receive traffic directly or indirectly to/from other networks, such as the Public Switched Telephone Network (PSTN), the Internet, or other networks. The one or more network interfaces 208 may take the form of Ethernet network interface cards/ports, optical network interface cards/ports or other physical interfaces to one or more transmission networks that directly or indirectly connect the base station 102 to its neighboring base stations as well as to the PSTN, the Internet, and/or other networks.

Additionally, in some embodiments, the one or more network interfaces 208 are configured to support transmissions to and from one or more network interfaces of one or more relays associated with the base station 200.

The one or more processors 210 comprise one or more general-purpose processors (e.g., microprocessors) and/or one or more special-purpose processors (e.g., dedicated digital signal processors (DSPs), application specific integrated circuits (ASICs), etc.). The non-transitory data storage 212 comprises one or more volatile and/or non-volatile storage components, such as magnetic or optical memory or disk storage. Non-transitory data storage 212 can be integrated in whole or in part with the one or more processors 210, as cache memory or registers for instance. As further shown, non-transitory data storage 212 is equipped to hold program instructions 214. In some embodiments, one or more of the processors 210 and non-transitory data storage 212 may be integrated in whole or in part with one or more of the wireless communications interfaces 202 and/or network communications interfaces 208.

The program instructions 214 comprise machine language instructions that define routines and software program code executable by the one or more processors 210 (alone or in combination with the wireless communications interface(s) 202 and network communications interface(s) 208) to carry out various functions described herein. In particular, the program code 214, wireless communications interfaces 202, and network communications interfaces 208 may operate cooperatively to carry out one or more aspects of the neighbor sector prioritization and/or handover methods described herein.

Figure 3:
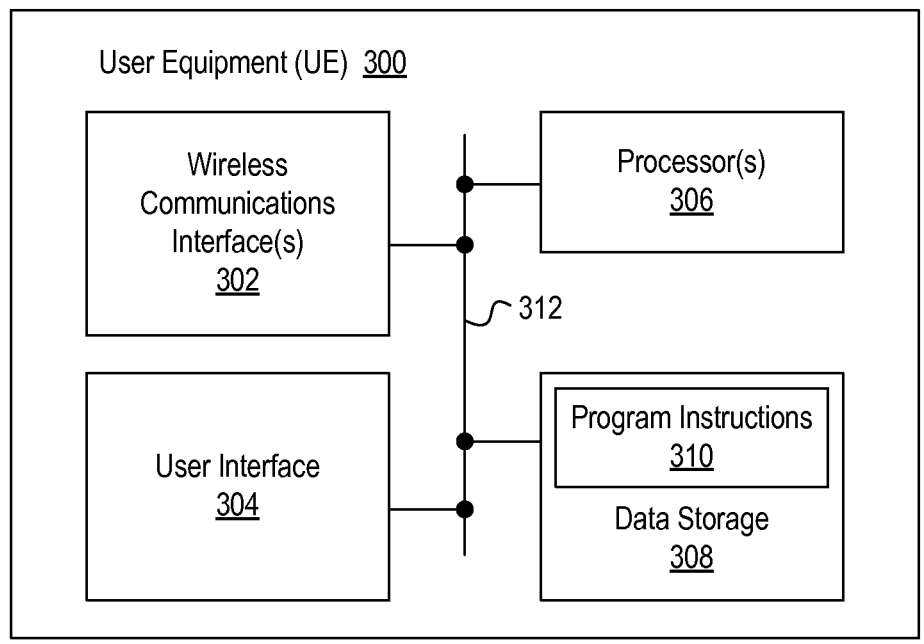
FIG. 3 is a simplified block diagram of an example UE according to some embodiments of the disclosed systems and methods.

FIG. 3 is a simplified block diagram of a UE 300 according to some embodiments of the disclosed systems and methods, including, for example, UE 110 shown in FIG. 1. The UE 300 is configured to operate in a communication system, such as the wireless communication system 100 of FIG. 1 for example, and may execute one or more functions described herein.

The UE 300 includes one or more wireless communication interfaces 302, one or more processors 306, a user interface 304, and non-transitory data storage 308 configured to store program instructions 304, all of which may be communicatively linked together by a system bus 312 or other similar mechanism. Variations from this arrangement are possible as well, including addition and/or omission of components, combination of components, and distribution of components in any of a variety of ways.

Wireless communication interface(s) 302 includes components (e.g., radios, antennas, communications processors) configured to engage in air interface communication within a configured frequency range of a base station. For example, the wireless communication interface 302 may include one or more antenna structures and chipsets arranged to support wireless communication according to one or more air interface protocols, such as the ones disclosed and described herein (e.g., CDMA, GSM, LTE) and perhaps others (e.g., WiFi, Bluetooth, etc.)

The one or more processors 306 include one or more general purpose processors (e.g., microprocessors) and/or special purpose processors (e.g., application specific integrated circuits or the like). In some embodiments, the one or more processors 306 may be integrated in whole or in part with the one or more wireless communication interfaces 302.

The non-transitory data storage 308 comprises one or more volatile and/or non-volatile storage components. The storage components may include one or more magnetic, optical, and/or flash memory components for example. In some embodiments, the non-transitory data storage 308 may be integrated in whole or in part with the one or more processors 306 and/or the wireless communication interface(s) 302. Additionally or alternatively, the non-transitory data storage 308 may be provided separately as a non-transitory machine readable medium.

The non-transitory data storage 308 may hold (e.g., contain, store, or otherwise be encoded with) program instructions 310 (e.g., machine language instructions or other program logic, markup or the like) executable by the one or more processors 306 to carry out the various functions described herein. The non-transitory data storage 308 may also hold reference data for use in carrying out various functions described herein, e.g., information relating to RSRP measurements for sectors that the UE periodically reports to its serving base station.

Figure 4:
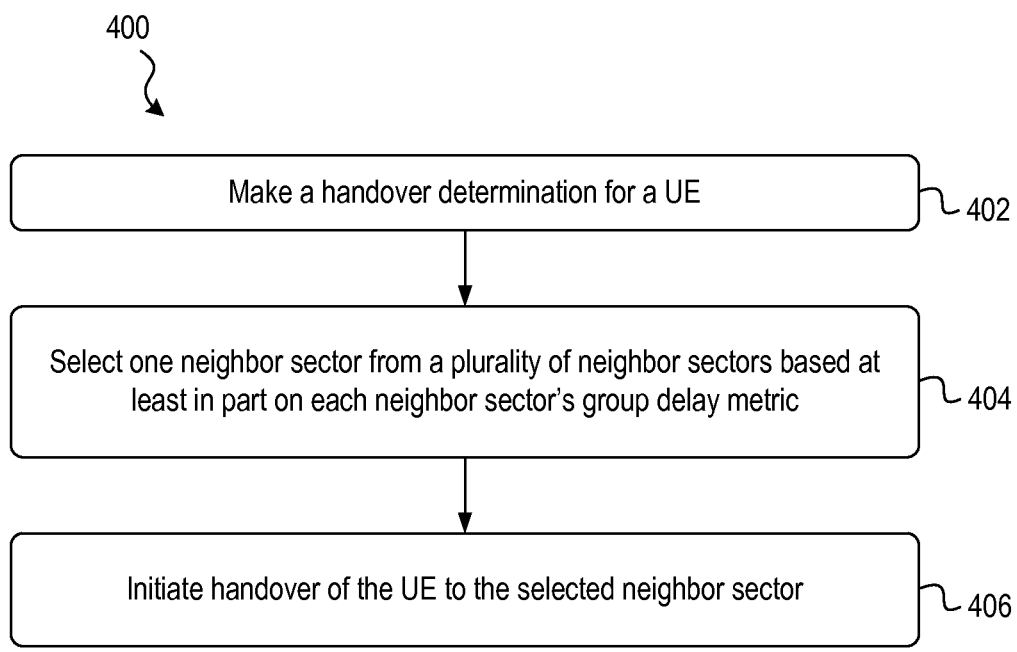
FIG. 4 is a method flow chart depicting aspects of some embodiments of the disclosed systems and methods.

FIG. 4 is a method flow chart depicting method 400, which includes aspects of some embodiments of the disclosed systems and methods of performing UE handovers. Method 400 may be performed by any type of base station now known or later developed, including, for example any of the base stations described herein. In some embodiments, method 400 is performed by a base station such as base station 102 operating in network 100 shown and described with reference to FIG. 1, where the base station provides service to UEs on at least one sector, and where that sector has a plurality of neighbor sectors.

Method 400 begins at step 402 where the base station makes a handover determination for a particular UE. In operation, the base station may determine that the UE should be handed over to another sector in a variety of ways. For example, in LTE embodiments, the base station may analyze data in the Measurement Report that the UE sends to the base station, such as the list of sectors the UE can detect, the signal quality of the sectors that the UE can detect, or any other factor or combination of factors in the UE's Measurement Report. Additionally or alternatively, the base station might also rely upon any other factor or group of factors to determine that a particular UE should be handed over to another sector.

After the base station has made the handover determination, method 400 proceeds to step 404 where the base station selects one neighbor sector from a plurality of neighbor sectors as the target neighbor sector for the handover. In operation, each neighbor sector of the plurality of neighbor sectors has a group delay metric, and the base station's selection of the neighbor sector is based at least in part on each neighbor sector's group delay metric. The group delay metric for a particular neighbor sector may be either the particular neighbor sector's group delay or the particular neighbor sector's group variation, both of which are a function of the filters in use by the base station that is providing service on that particular neighbor sector as described previously.

In some embodiments, selecting the one neighbor sector includes first choosing a set of candidate neighbor sectors from the plurality of neighbor sectors, and then selecting the one neighbor sector (as the target sector) from the set of candidate neighbor sectors. In such embodiments, the selected one neighbor sector is the neighbor sector having the lowest group delay metric of the chosen set of candidate neighbor sectors.

In embodiments where selecting the one neighbor sector includes first choosing a set of candidate neighbor sectors, the chosen set of candidate neighbor sectors may be based on one or both of each neighbor sector's (i) handover success rate and/or (ii) RSRP value, as reported by the UE for which the base station made the handover determination in step 402. In some embodiments, the chosen set of candidate neighbor sectors consists of the neighbor sectors of the plurality of neighbor sectors having a handover success rate that exceeds a threshold handover success rate. In other embodiments, the chosen set of candidate neighbor sectors consists of the neighbor sectors of the plurality of neighbor sectors having an RSRP value that exceeds a threshold RSRP value. In still further embodiments, the chosen set of candidate neighbor sectors consists of the neighbor sectors of the plurality of neighbor sectors having both (i) a handover success rate that exceeds a handover success rate threshold and (ii) a RSRP value that exceeds a RSRP value threshold.

After selecting the one neighbor sector at step 404, method 400 proceeds to step 406 where the base station initiates handover of the UE to the selected neighbor sector. In some embodiments, to initiate the handover of the UE to the selected neighbor sector, the base station may send a handover request message to the base station providing wireless service on the selected neighbor sector.

Figure 5:
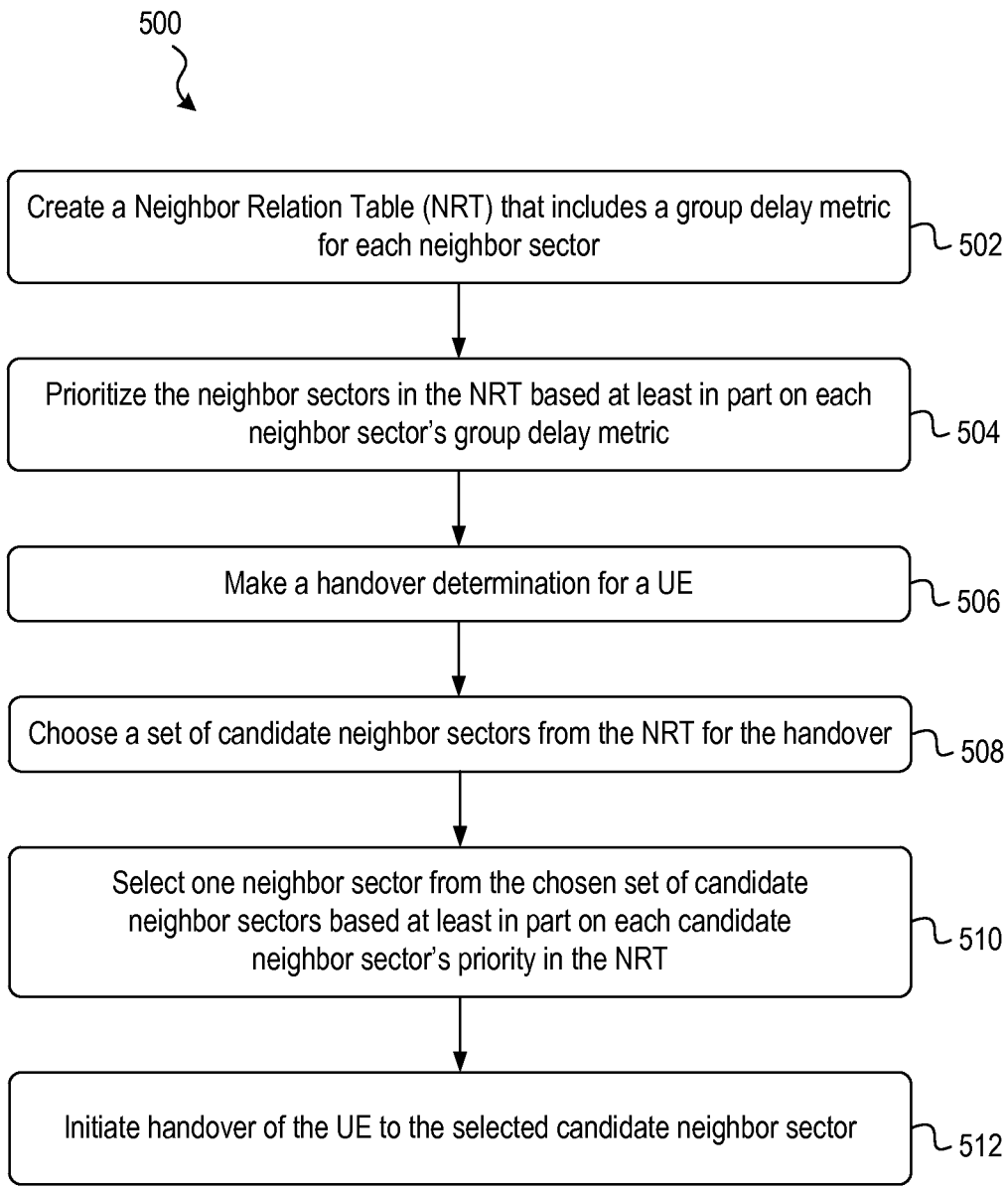
FIG. 5 is a method flow chart depicting aspects of some embodiments of the disclosed systems and methods.

FIG. 5 is a method flow chart depicting method 500, which includes aspects of some embodiments of the disclosed systems and methods for prioritizing a neighbor relation table and/or selecting a target sector for handover. Method 500 may be performed by any type of base station now known or later developed, including, for example any of the base stations described herein. In some embodiments, method 500 is performed by a base station such as base station 102 operating in network 100 shown and described with reference to FIG. 1, where the base station provides service to UEs on at least one sector, and where that sector has a plurality of neighbor sectors.

Method 500 begins at step 502, where the base station creates a neighbor relation table (NRT) that includes a group delay metric for each neighbor sector. The group delay metric for a particular neighbor sector may be either the particular neighbor sector's group delay or the particular neighbor sector's group delay variation, both of which are a function of the filters in use by the base station that is providing service on that particular neighbor sector, as described previously.

In some embodiments, the base station may create the NRT for a particular sector by including in the NRT, only those neighbor sectors that have a group delay metric that is less than a group delay metric threshold. In other embodiments, the base station may create the NRT for a particular sector by excluding from the NRT, any neighbor sector that has a group delay metric that exceeds the group delay metric threshold.

At step 504, the base station prioritizes the neighbor sectors in the NRT created at step 502. In operation, the base station prioritizes the neighbor sectors in the NRT according to each neighbor sector's group delay metric. In some embodiments, the group delay metric for a particular neighbor sector may be the group delay introduced by the filters used by the base station to provide wireless service in that particular neighbor sector. In other embodiments, the group delay metric for a particular neighbor sector may be the group delay variation caused by the group delay introduced by the filters used by the base station to provide wireless service in that particular neighbor sector. In operation, prioritizing the neighbor sectors in the NRT in step 504 based at least in part on each neighbor sector's group delay metric includes ordering the neighbor sectors from lowest group delay (or group delay variation) to highest group delay (or group delay variation) within the NRT.

At step 506, the base station makes a handover determination for a UE. In operation, the base station may make the handover determination (i.e., determine that the UE should be handed over to another sector) in a variety of ways. For example, in LTE embodiments, the base station may analyze data in the Measurement Report that the UE sends to the base station, such as the list of sectors the UE can detect, the signal quality of the sectors that the UE can detect, or any other factor or combination of factors in the UE's Measurement Report. Additionally or alternatively, the base station might also rely upon any other factor or group of factors to determine that a particular UE should be handed over to another sector.

After the base station has made the handover determination at step 506, method 500 proceeds to step 508 where the base station chooses a set of candidate neighbor sectors from the NRT to consider for the handover of the UE. In some embodiments, the base station chooses the set of candidate neighbor sectors based on one or both of each neighbor sector's (i) handover completion percentage (or success rate) and/or (ii) RSRP value reported by the UE for which the base station made the handover determination in step 506. In some embodiments, the chosen set of candidate neighbor sectors consists of the neighbor sectors in the NRT that have a handover success rate that exceeds a threshold handover success rate. In other embodiments the chosen set of candidate neighbor sectors consists of the neighbor sectors in the NRT that have a RSRP value reported by the UE that exceeds a threshold RSRP value. In still further embodiments, the chosen set of candidate neighbor sectors consists of the neighbor sectors in the NRT that have both (i) a handover success rate that exceeds a threshold handover success rate and (ii) a RSRP value reported by the UE that exceeds a threshold RSRP value.

At step 510, the base station selects one neighbor sector from the chosen set of candidate neighbor sectors to be the target neighbor sector for the handover. In operation, the base station's selection of the target neighbor sector for the handover is based at least in part on each candidate neighbor sector's priority in the NRT, which in step 504, is based at least in part on each neighbor sector's group delay (or group delay variation). Thus, in this manner, method 500 comprises selecting the target neighbor sector from a plurality of neighbor sectors based at least in part on each neighbor sector's group delay metric.

After selecting one of the neighbor sectors from the chosen set of candidate neighbor sectors in step 510 as the target neighbor sector for the handover of the UE, method 500 proceeds to step 512 where the base station initiates the handover of the UE to the selected neighbor sector (i.e., the target neighbor sector) by, for example, sending a handover request message to the base station providing service on the selected target neighbor sector.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular example embodiments only, and is not intended to be limiting. For example, while the disclosed example embodiments focus on LTE-based implementations, the disclosed systems and methods are equally applicable to any other protocol or network implementation that is configurable to create and prioritize neighbor relation tables (or similar neighbor sector lists) and/or handover UEs based at least in part on group delay and/or group delay variation as described herein.

What is claimed is:

1. A method comprising:
in a wireless network comprising a plurality of sectors, wherein each sector has a group delay metric, a base station making a handover determination for a UE;
in response to making the handover determination, the base station selecting from a Neighbor Relation Table (NRT), one neighbor sector from a plurality of neighbor sectors based at least in part on each neighbor sector's group delay metric, wherein the NRT includes each neighbor sector's group delay metric; and
the base station initiating handover of the UE to the selected neighbor sector.

2. The method of claim 1, wherein selecting one neighbor sector from the plurality of neighbor sectors based at least in part on each neighbor sector's group delay metric comprises:
choosing a set of candidate neighbor sectors for the handover from the plurality of neighbor sectors; and
selecting the one neighbor sector from the set of candidate neighbor sectors, wherein the selected one neighbor sector has the lowest group delay metric of the chosen set of candidate neighbor sectors.

3. The method of claim 2, wherein the chosen set of candidate neighbor sectors consists of the neighbor sectors of the plurality of neighbor sectors having a handover success rate that exceeds a threshold handover success rate.

4. The method of claim 2, wherein the chosen set of candidate neighbor sectors consists of the neighbor sectors of the plurality of neighbor sectors having a Reference Signal Receive Power (RSRP) value that exceeds a threshold RSRP value.

5. The method of claim 1, further comprising:
creating the NRT comprising at least some of the plurality of neighbor sectors; and
prioritizing the neighbor sectors in the NRT based at least in part on each neighbor sector's group delay metric, wherein neighbor sectors in the NRT having a lower group delay metric have a higher priority than neighbor sectors in the NRT having a higher group delay metric.

6. The method of claim 5, wherein creating the NRT comprising at least some of the plurality of neighbor sectors comprises:
adding neighbor sectors to the NRT that have a group delay metric that is less than a group delay metric threshold.

7. The method of claim 5, wherein creating the NRT comprising at least some of the plurality of neighbor sectors comprises:
excluding neighbor sectors from the NRT that have a group delay metric that exceeds a group delay metric threshold.

8. The method of claim 1, wherein the group delay metric is a measure of group delay variation.

9. The method of claim 1, wherein the plurality of neighbor sectors are sectors provided by one or more LTE eNodeB network elements.

10. A base station comprising:
one or more wireless communications interfaces configured to operate in a wireless network comprising a plurality of sectors, wherein each sector has a group delay metric; and
one or more processors configured to (i) make a handover determination for a UE served by the base station, (ii) in response to making the handover determination, select from a Neighbor Relation Table (NRT), one neighbor sector from a plurality of neighbor sectors based at least in part on each neighbor sector's group delay metric, wherein the NRT includes each neighbor sector's group delay metric, and (iii) initiate handover of the UE to the selected neighbor sector.

11. The base station of claim 10, wherein the one or more processors, as part of selecting one neighbor sector from the plurality of neighbor sectors based at least in part on each neighbor sector's group delay metric, is further configured to: (i) choose a set of candidate neighbor sectors for the handover from the plurality of neighbor sectors; and (ii) select the one neighbor sector from the set of candidate neighbor sectors, wherein the selected one neighbor sector has the lowest group delay metric of the chosen set of candidate neighbor sectors.

12. The base station of claim 11, wherein the chosen set of candidate neighbor sectors consists of the neighbor sectors of the plurality of neighbor sectors having a handover success rate that exceeds a handover success rate threshold.

13. The base station of claim 11, wherein the chosen set of candidate neighbor sectors consists of the neighbor sectors of the plurality of neighbor sectors having a Reference Signal Receive Power (RSRP) value that exceeds a threshold RSRP value.

14. The base station of claim 10, wherein the one or more processors are further configured to (i) create the NRT comprising at least some of the plurality of neighbor sectors, and (ii) prioritize the neighbor sectors in the NRT based at least in part on each of neighbor sector's group delay metric, wherein neighbor sectors having a lower group delay metric have a higher priority than neighbor sectors having a higher group delay metric.

15. The base station of claim 14, wherein the one or more processors, as part of creating the NRT comprising at least some of the plurality of neighbor sectors, are further configured to add neighbor sectors to the NRT that have a group delay metric that is less than a group delay variation threshold.

16. The base station of claim 14, wherein the one or more processors, as part of creating the NRT comprising at least some of the plurality of neighbor sectors, are further configured to exclude neighbor sectors from the NRT that have a group delay metric that exceeds a group delay variation threshold.

17. The base station of claim 10, wherein the group delay metric is a measure of group delay variation.

18. The base station of claim 10, wherein the plurality of neighbor sectors are sectors provided by one or more LTE eNodeB network elements.

19. An article of manufacture comprising tangible, non-transitory computer-readable memory having instructions encoded therein, wherein the instructions, when executed by one or more processors of a base station, cause the base station to perform functions comprising:
selecting a target neighbor sector for handover of a UE, wherein the target neighbor sector is selected from a plurality of neighbor sectors stored in a Neighbor Relation Table (NRT) based at least in part on each neighbor sector's group delay metric, wherein the NRT includes each neighbor sector's group delay metric; and
initiating handover of the UE to the target neighbor sector.

20. The article of manufacture of claim 19, wherein the instructions cause the base station to perform further functions comprising:

choosing a set of candidate neighbor sectors for the handover from the plurality of neighbor sectors, wherein the chosen set of candidate neighbor sectors consists of the neighbor sectors of the plurality of neighbor sectors having one or both of (i) a handover success rate that exceeds a threshold handover success rate and/or (ii) a Reference Signal Receive Power (RSRP) value that exceeds a threshold RSRP value; and selecting the target neighbor sector from the set of candidate neighbor sectors, wherein the selected target neighbor sector has the lowest group delay metric of the chosen set of candidate neighbor sectors.

\* \* \* \* \*